(12) United States Patent
Stallings et al.

(10) Patent No.: US 9,189,500 B2
(45) Date of Patent: Nov. 17, 2015

(54) GRAPHICAL FLASH VIEW OF DOCUMENTS FOR DATA NAVIGATION ON A TOUCH-SCREEN DEVICE

(75) Inventors: Heath Stallings, Colleyville, TX (US); Sok Y. Hwang, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1227 days.

(21) Appl. No.: 12/650,829

(22) Filed: Dec. 31, 2009

(65) Prior Publication Data

US 2011/0161845 A1 Jun. 30, 2011

(51) Int. Cl.
*G06F 3/048* (2013.01)
*G06F 17/30* (2006.01)
*G06F 3/0483* (2013.01)

(52) U.S. Cl.
CPC ........ *G06F 17/30277* (2013.01); *G06F 3/0483* (2013.01)

(58) Field of Classification Search
CPC .. G06F 3/042; G06F 17/30277; G06F 3/0483

USPC .......................................................... 715/762
See application file for complete search history.

(56) References Cited

U.S. PATENT DOCUMENTS

| 7,426,700 | B2 * | 9/2008 | Sheldon et al. | 715/810 |
|---|---|---|---|---|
| 2003/0014415 | A1 * | 1/2003 | Weiss et al. | 707/10 |
| 2004/0015517 | A1 * | 1/2004 | Park et al. | 707/104.1 |
| 2004/0125143 | A1 * | 7/2004 | Deaton et al. | 345/765 |
| 2007/0143714 | A1 * | 6/2007 | Barbieri | 715/861 |
| 2008/0301586 | A1 * | 12/2008 | Ayatsuka et al. | 715/840 |
| 2009/0164489 | A1 * | 6/2009 | Matsuda et al. | 707/100 |
| 2009/0249210 | A1 * | 10/2009 | Sheldon et al. | 715/730 |

* cited by examiner

*Primary Examiner* — Sara England

(57) ABSTRACT

Content may be displayed on a display of a device as part of a graphical interface in which the content is divided into categories or sections. A content item representing a particular group of content items, such as a group corresponding to a category, may be graphically "flashed" to the user as the user pans or scrolls through content. In particular implementation, a computing device may determine a group of active content items corresponding to a current navigation point of a set of content items, determine a representative content item from the group of active content items, and present an area displaying the representative content item.

21 Claims, 11 Drawing Sheets

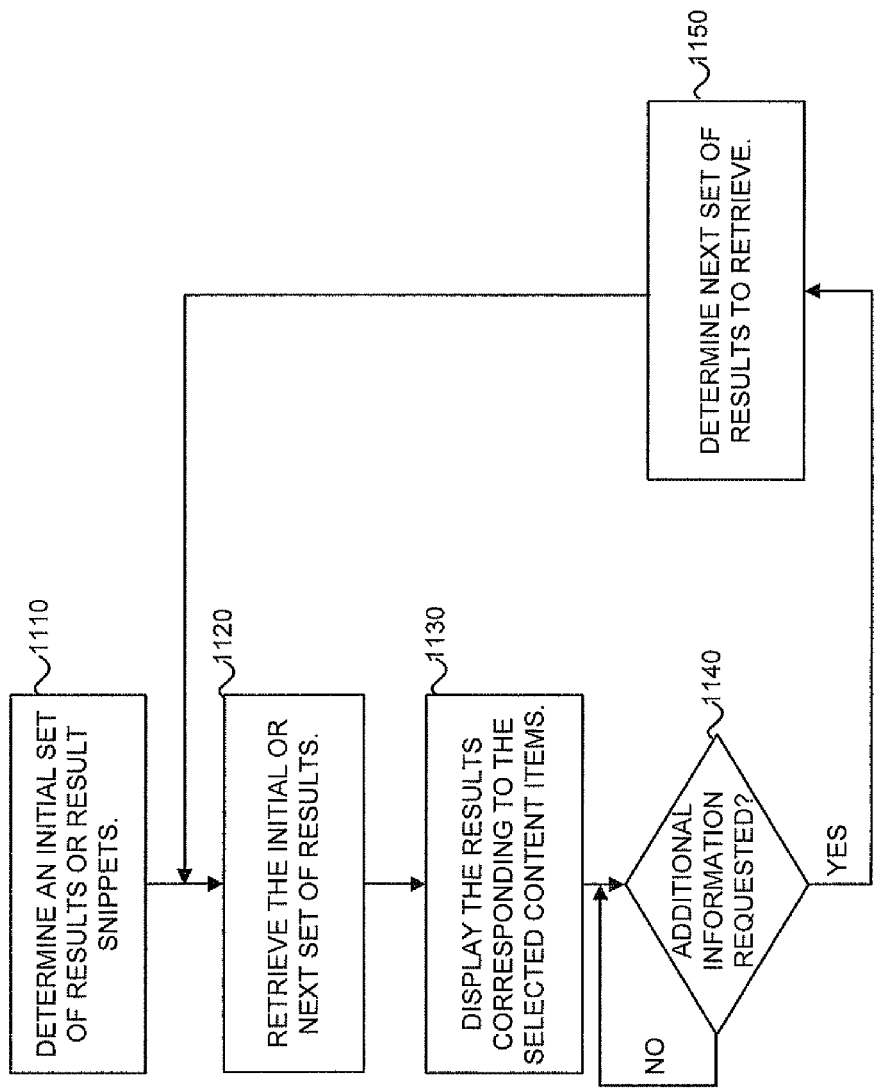

1

GRAPHICAL FLASH VIEW OF DOCUMENTS FOR DATA NAVIGATION ON A TOUCH-SCREEN DEVICE

BACKGROUND INFORMATION

Electronic devices continue to increase in complexity and functionality. This poses several challenges to designers of such devices. For example, it may be difficult to develop and provide an intuitive, functional, and convenient user interface for an electronic device having robust functionality, especially when the device is small in size.

Recently, touch-screen displays have become popular user interfaces for certain electronic devices. Touch-screens are especially conducive to small electronic devices at least because they allow for an expansive set of user inputs and can replace other limited input interfaces such as dedicated mechanical input buttons. However, there remains room to improve upon standard touch-screen interfaces.

BRIEF DESCRIPTION OF THE DRAWINGS

FIG. 11 is a flow chart illustrating downloading content on an as-needed basis over a network.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein relate to touch-screen displays, such as a touch-screen display implemented as part of a mobile phone or another device. Content may be displayed as part of a graphical interface in which specific content items are graphically "flashed" to the user as the user pans or scrolls through content. A content item that is flashed to the user may be chosen as one that is representative of the current section of content. In some implementations, the content may be remotely stored over a relatively slow network. In this situation, the device may cache content as necessary to potentially present a responsive interface even over a slow network.

Figure 1:
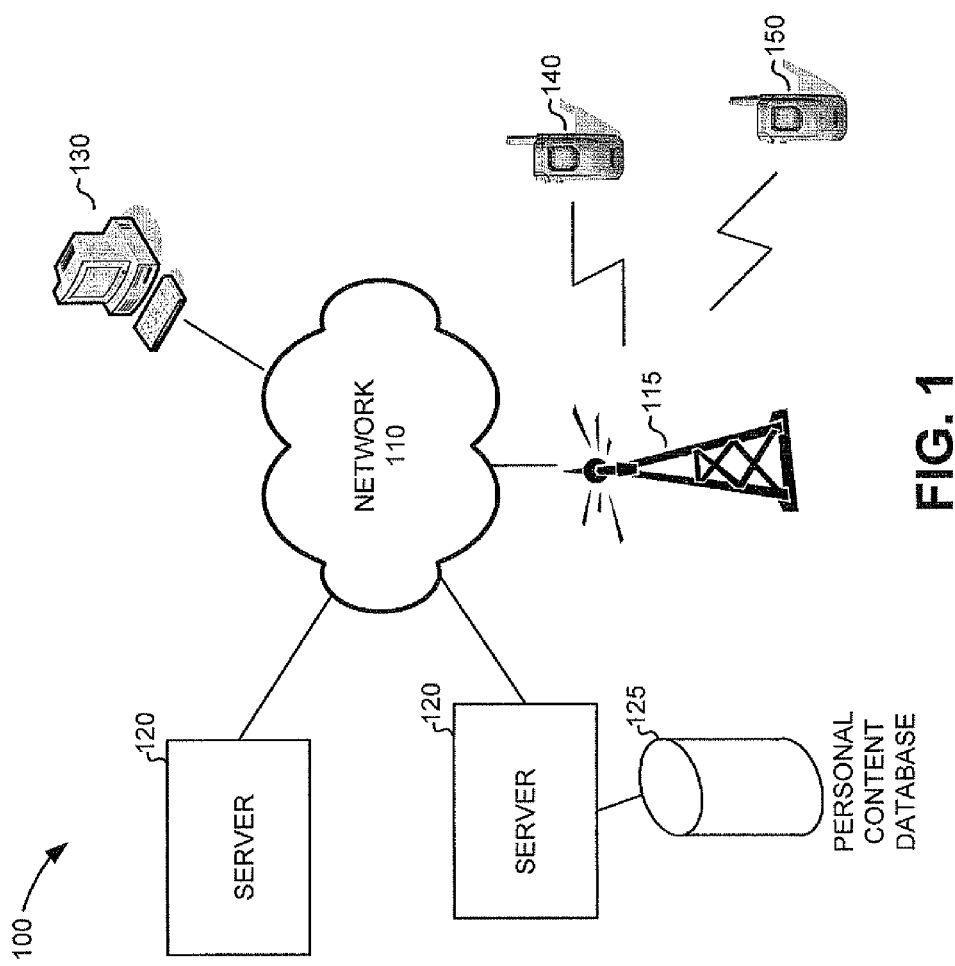
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects one or more server devices 120 to end-user devices 130, 140, and 150. As shown, end-user device 130 may represent a computing device 130 and devices 140 and 150 may represent mobile phones. In general, server devices 120 may provide or control, via network 110, telecommunication services such as telephone, television, data network connectivity (e.g., Internet), and/or wireless mobile connectivity (e.g., cellular phone connectivity).

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to end-user devices 130, 140, and 150.

An antenna 115 is also shown in FIG. 1 to illustrate that network 110 may include wireless nodes, such as nodes used to implement a cellular network. Mobile phones 140 and 150 may, for instance, connect to voice and data services through a cellular network that includes network 110 and antenna 115.

Server devices 120 may include servers or other network devices used to deliver or control delivery of the telecommunication services to computer device 130 and/or mobile phones 140 and 150. For example, server devices 120 may include web servers, network switches or routers, network gateways, television broadcast facilities, etc.

In one particular implementation, servers 120 may deliver content to mobile phones 140 and 150. The content may be, for example, generally available content, such as web pages or personal content. A personal content database 125 is shown in FIG. 1 as connected to one of servers 120. Personal content database 125 may be a database or other structure that stores, for instance, private user data such as documents, images, or multi-media content. Server 120 may deliver the content (e.g., from personal content database 125) to mobile phones 140 and 150, as desired by the users of mobile phones 140 and 150.

Computing device 130 may include for example, a personal computer, such as a desktop computer, a laptop computer, a personal digital assistant (PDA), etc., used for general computing tasks. A user of computing device 130 may connect through network 110 to communicate with other user devices or servers connected to network 110.

Mobile phones 140 and 150 may include any mobile communication device. Mobile phones 140 and 150 may wirelessly connect through network 110 to other devices. Mobile phones 140 and 150 may, for instance, be used to place telephone calls with landline phones or other mobile phones, view content (e.g., web content, personal documents, multi-media content) received from servers 120, and/or send and receive instant messages. Mobile phones 140 and 150 may particularly be, for instance, cell phones, personal digital assistants (PDAs), or smart phones. In one implementation, mobile phones 140 and 150 may include touch-sensitive screens, called touch-screens herein, with which a user may interact.

Although FIG. 1 shows exemplary components of system 100, in other implementations, system 100 may contain fewer, different, differently arranged, or additional components than depicted in FIG. 1.

Figure 2:
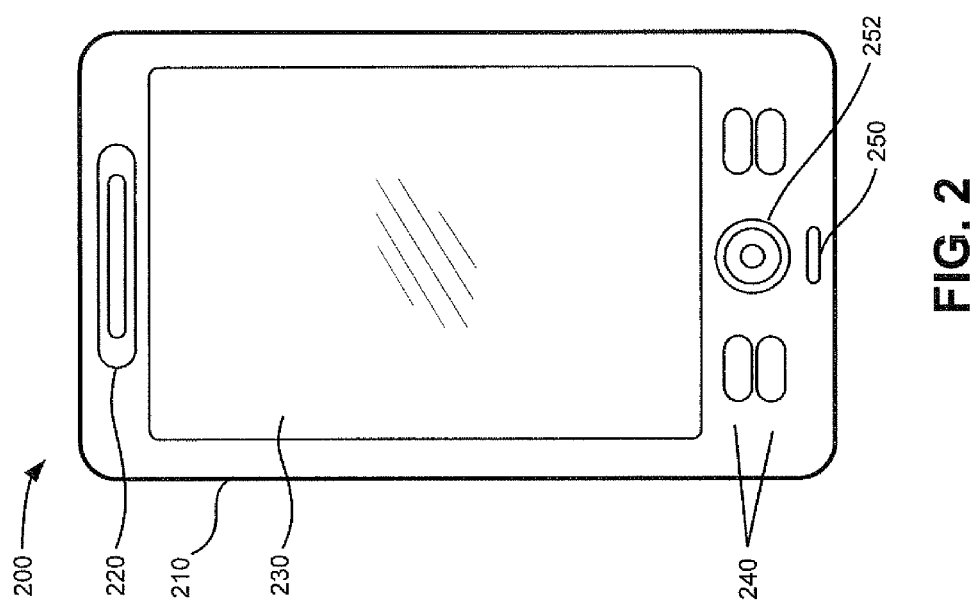
FIG. 2 is a diagram illustrating an exemplary device of FIG. 1 that may include a touch-screen.

FIG. 2 is a diagram illustrating an exemplary device 200 that may include a touch-screen, such as one of mobile phones 140 or 150. Device 200 may include a housing 210, a speaker 220, a touch-screen display 230, control buttons 240, and/or a microphone 250. Housing 210 may protect the components of device 200 from outside elements. Housing 210 may include a structure configured to hold devices and components used in device 200, and may be formed from a variety of materials. For example, housing 210 may be formed from plastic, metal, or a composite, and may be configured to support speaker 220, touch-screen 230, control buttons 240, and/or microphone 250.

Speaker 220 may provide audible information to a user of device 200. Speaker 220 may be located in an upper portion of device 200, and may function as an ear piece when a user is engaged in a communication session using device 200. Speaker 220 may also function as an output device for music and/or audio information associated with games and/or video images played on device 200.

Touch-screen display 230 may provide visual information to the user. For example, touch-screen 230 may display text, images, video, and/or graphics received from another device, and/or information regarding incoming or outgoing calls or text messages, emails, media, games, phone books, address books, the current time, etc. In one example, touch-screen 230 may include a liquid crystal display (LCD), such as a thin film transistor (TFT) LCD, etc.

In one implementation, touch-screen 230 may be configured to receive user input when a user touches (or comes in close proximity to) touch-screen 230. For example, the user may provide an input to touch-screen 230 directly, such as via the user's finger, or via other devices, such as a stylus. User inputs received via touch-screen 230 may be processed by components and/or devices operating in device 200. Touch-screen 230 may permit the user to interact with device 200 in order to cause device 200 to perform one or more operations. Exemplary technologies to implement a touch screen on touch-screen 230 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows touch-screen 230 to be used as an input device. Touch-screen 230 may also identify movement of a body part or a pointing device as it moves on or near the surface of the touch-screen-enabled display 230.

Further, in some implementations, touch-screen 230 may be configured to distinguish between different touch pressures. For instance, a user may touch and move a finger over touch-screen 230 to emulate movement of a pointing device and may then press harder on touch-screen 230 to select an object.

Control buttons 240 may permit the user to interact with device 200 to cause device 200 to perform one or more operations. For example, control buttons 240 may be used to cause device 200 to transmit information. Microphone 250 may receive audible information from the user. For example, microphone 250 may receive audio signals from the user and may output electrical signals corresponding to the received audio signals.

Control buttons 240, or other controls associated with device 200, may also be used to interact with the display to potentially perform actions similar to those that could be performed via touch interaction with a touch-screen display. For example, control buttons 240 may be arranged to include a directional pad (D-pad) that can be used to input directional signals to device 200. The D-pad may include, for instance, four buttons through which a user can input "up", "down", "right", or "left" signals. The buttons of the D-pad may be arranged so that they can be easily actuated using, for example, a thumb or other finger. An exemplary D-pad 252 is particularly shown in FIG. 2 as a round pad that a user may actuate in different directions with a finger.

Although FIG. 2 shows exemplary components of device 200, in other implementations, device 200 may contain fewer, different, differently arranged, or additional components than depicted in FIG. 2. For example, in some implementations, device 200 may include a keypad, such as a standard telephone keypad, a QWERTY-like keypad (e.g., a traditional configuration of typewriter or computer keyboard keys), or another keypad layout. In still other implementations, a component of device 200 may perform one or more tasks described as being performed by another component of device 200.

Figure 3:
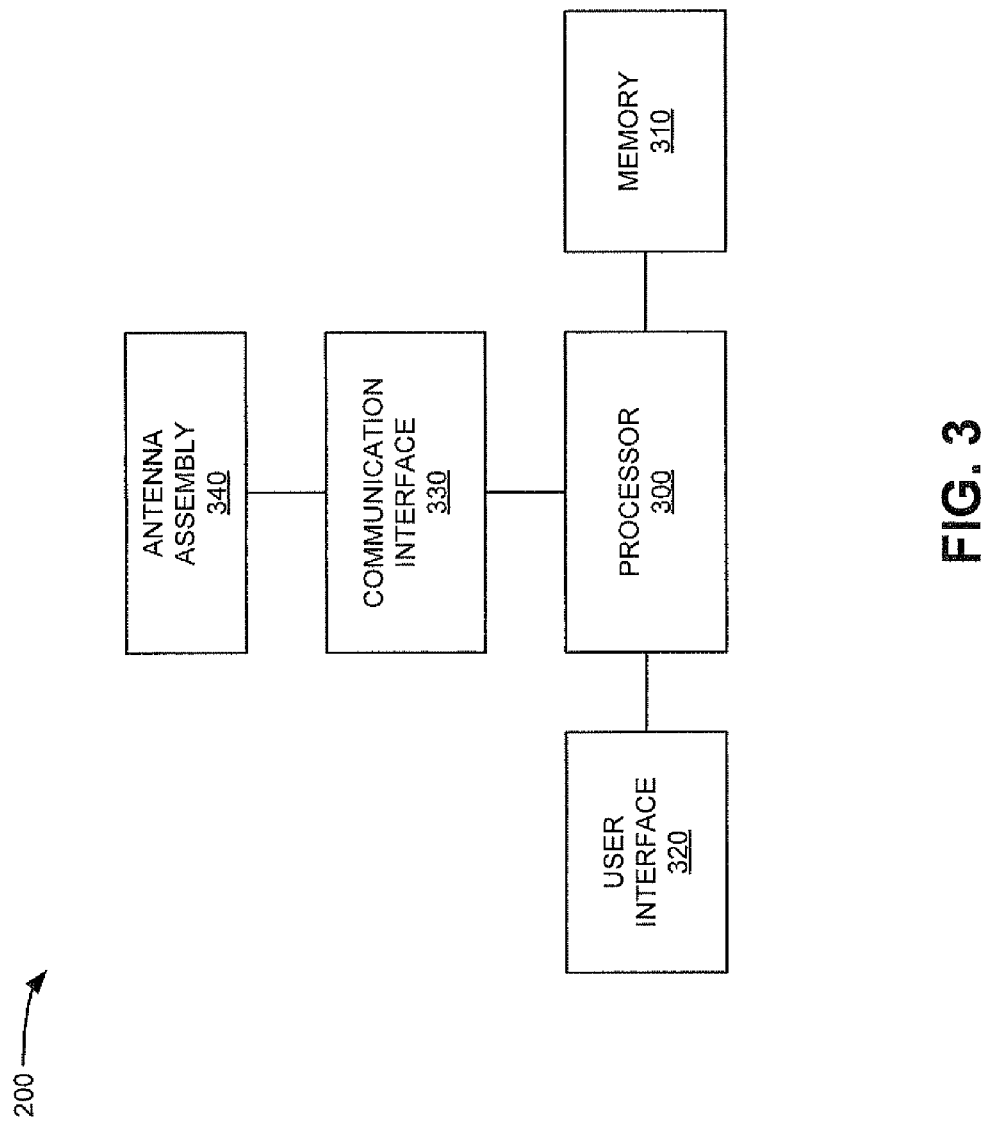
FIG. 3 is a diagram illustrating exemplary components of the device shown in FIG. 2.

FIG. 3 is a diagram of exemplary components of device 200. As illustrated, device 200 may include a processor 300, a memory 310, a user interface 320, a communication interface 330, and/or an antenna assembly 340.

Processor 300 may include one or more microprocessors, application specific integrated circuits (ASICs), field programmable gate arrays (FPGAs), or the like. Processor 300 may control operation of device 200 and its components. In one implementation, processor 300 may control operation of components of device 200 in a manner described herein.

Memory 310 may include a random access memory (RAM), a read-only memory (ROM), and/or another type of memory to store data and instructions that may be used by processor 300. In one implementation, memory 310 may store instructions for displaying content using a graphical interface that will be described in more detail below.

User interface 320 may include mechanisms for inputting information to device 200 and/or for outputting information from device 200. Examples of input and output mechanisms might include buttons (e.g., control buttons 240, keys of a keypad, a joystick, etc.); a speaker (e.g., speaker 220) to receive electrical signals and output audio signals; a microphone (e.g., microphone 250) to receive audio signals and output electrical signals; a display (e.g., display 230) to receive touch input and to output visual information; a vibrator to cause device 200 to vibrate; and/or a camera to receive video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, device 200 may perform certain operations described herein in response to processor 300 executing software instructions of an application contained in a computer-readable medium, such as memory 310. A computer-readable medium may be defined as a physical or logical memory device. A logical memory device may include a space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 200, in other implementations, device 200 may contain fewer, different, differently arranged, or additional components than depicted in FIG. 3. In still other implementations, a component of device 200 may perform one or more other tasks described as being performed by another component of device 200.

Figure 4:
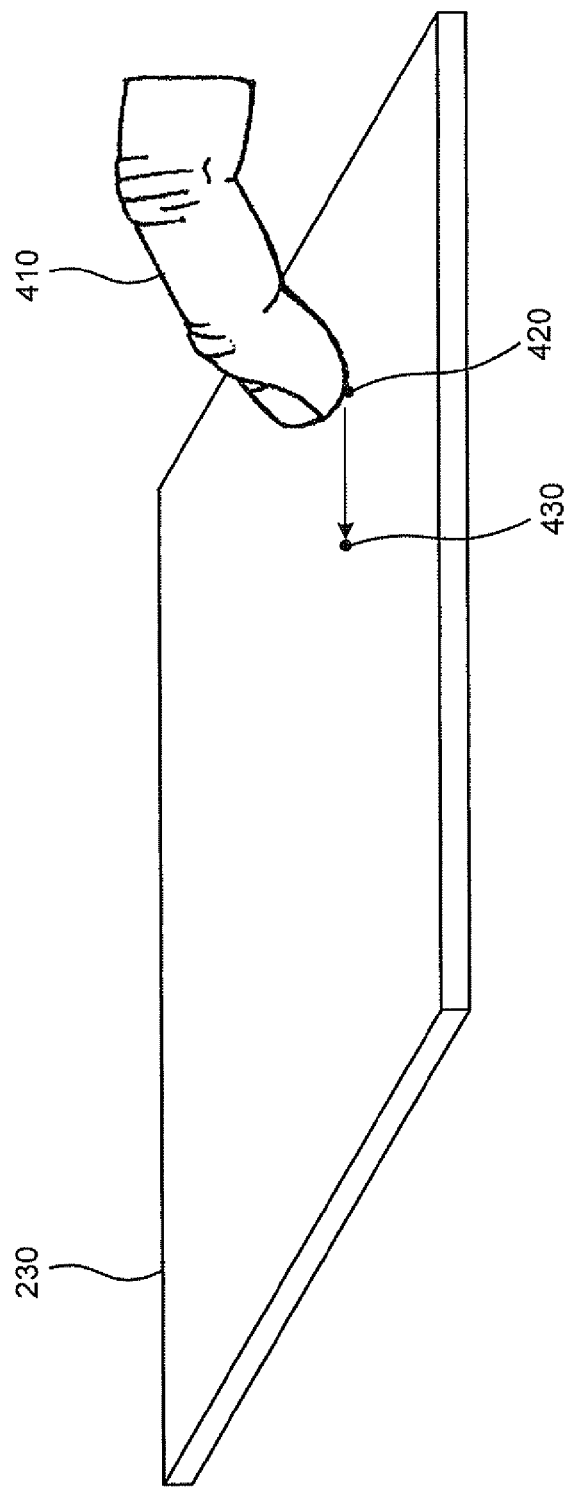
FIG. 4 is a perspective view illustrating exemplary interaction with a touch-screen.

FIG. 4 is a perspective view illustrating interaction with touch-screen 230 by an object 410. In this example, object 410 is the finger of a user. In general, any object that may be sensed by the touch-screen 230 may be used to interact with touch-screen 230. For example, object 410 may include a stylus or any other physical object that can touch and be sensed by touch-screen 230.

When object 410 touches position 420 as shown, touch-screen 230 may sense the object touch at position 420 and generate and provide at least one signal representative of the object touch. The signal may be processed by, for example, processor 300, to detect the object touch at position 420 and to perform an action in response to the detected object touch. Processor 300 may be configured to recognize any object touch as may suit a particular implementation, including a generally stationary, temporary, and/or sustained object touch. In certain embodiments, an object touch may include a sustained, generally stationary touch of a position 420 on touch-screen 230 by object 410.

While touching touch-screen 230, object 410 may move about on the surface (e.g., slide across the surface) of touch-screen 230. Such movement of object 310 while touching touch screen 230 may be referred to herein as a "touch gesture." A touch gesture may include any movement of object 410 from a starting position (e.g., position 420) to one or more other positions on touch-screen 230, such as position 430. A touch gesture may include a movement in a particular direction and may thus be associated with a particular direction. Such a touch gesture may be referred to as a "directional touch gesture."

FIG. 4 illustrates an exemplary directional touch gesture including movement of object 410 beginning at position 420 and in a direction represented by arrow 430 in FIG. 4. The example shown in FIG. 4 is just one example of a directional touch gesture. In this example, the directional touch gesture comprises a generally linear movement in a particular direction away from position 420. This is illustrative only. Other directional touch gestures may be used and recognized by touch-screen 230. In some implementations, touch-screen 230 may support multipoint touch gestures.

Consistent with aspects described herein, a graphical interface designed to assist in navigating user content may include a graphic element that is "flashed" to the user as the user scrolls through pages of content items. In some implementations, one or more graphical tabs, each corresponding to categories or sections of the content, may also be presented to the user.

Figure 5:
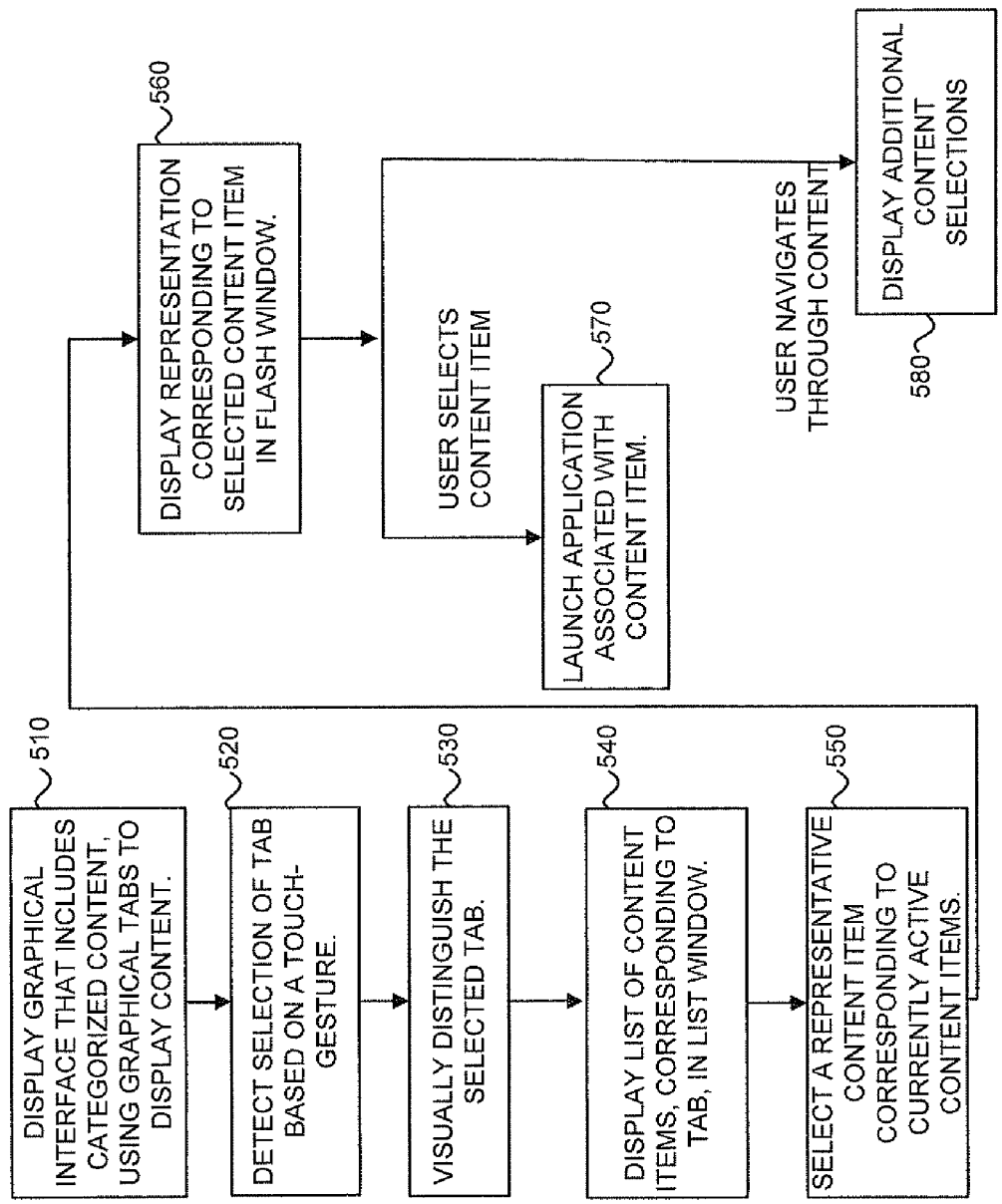
FIG. 5 is a flow chart illustrating exemplary operations for operating the device of FIG. 2 to present content to a user through a graphical interface.

FIG. 5 is a flow chart illustrating exemplary operations for operating device 200 to present content to a user through a graphical interface. In one implementation, the operations shown in FIG. 5 may be performed by device 200.

As shown in FIG. 5, device 200 may display a graphical interface that includes categorized items of content (block 510). Graphical tabs may be displayed to help navigate the content (block 510). The graphical interface may be displayed, for example, as part of a "content viewer" or search application that the user initiates from device 200.

Figure 6:
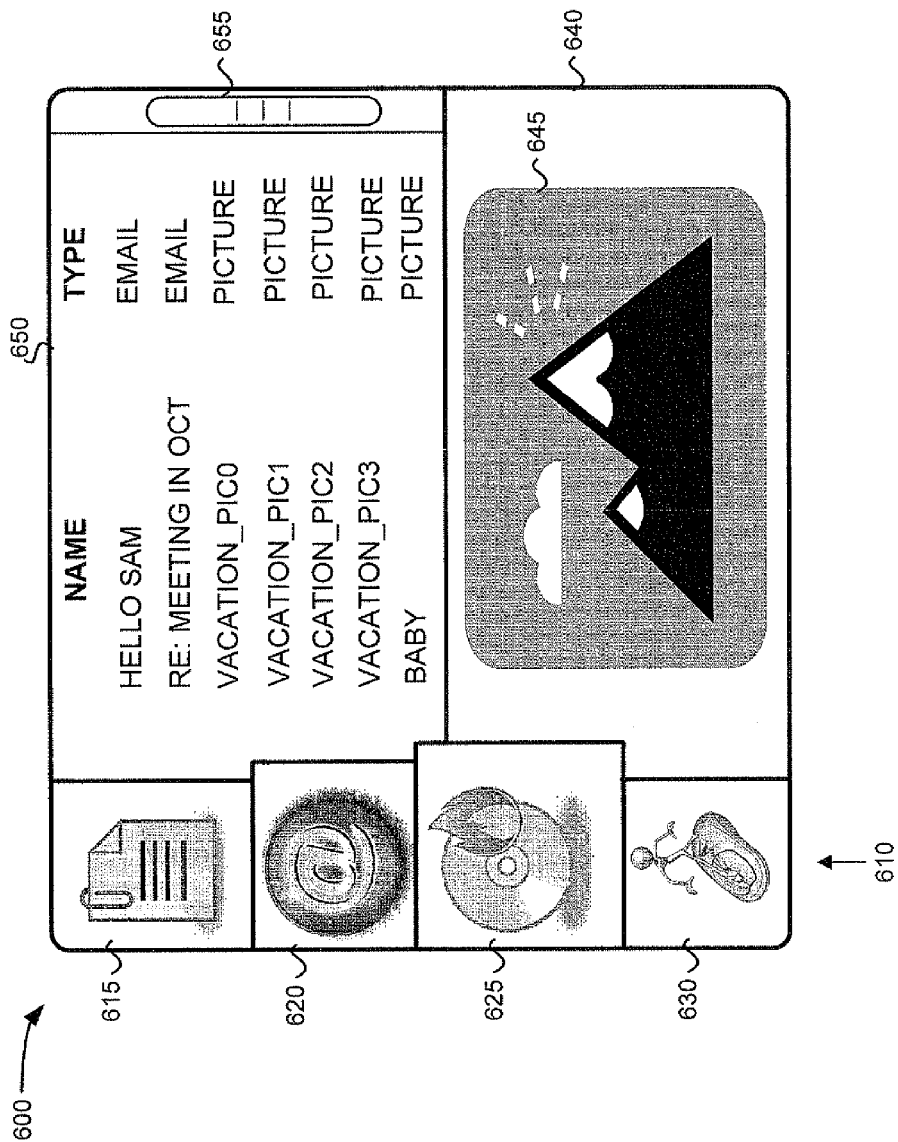
FIG. 6 is a diagram illustrating an exemplary graphical interface that may present categorized content.

FIG. 6 is a diagram illustrating an exemplary graphical interface 600 that may present categorized content, such as the graphical interface referred to in block 510 (FIG. 5). Graphical interface 600 may be displayed, for instance, in response to the user requesting to view information (content). For example, the user may perform a search or request to view files, such as files stored at personal content database 125 or on device 200. The user may, for instance, store a number of different types of files in personal content database 125, such as word processing documents, music files, spreadsheets, saved web pages, or other files. The files may, in aggregate, be relatively large. Accordingly, it may be impractical or undesirable to download all the results of a search, as doing so may take up too much time or resources, particularly if the network connection is not particularly fast.

In addition to a search for information, graphical interface 600 may be displayed at other times, such as when the user is browsing groups of files, such as music files or documents. In the case of music files, for instance, the files may be categorized by genre and in the case of documents, the files may be categorized by the type of file. In some instances, the files being browsed may have no natural categorization, and the categorization may be based on, for example, an alphabetical or sequential partitioning of the files.

In any case, device 200 may obtain a list or set of links or other references to content items based on the user request for information.

As particularly shown in FIG. 6, graphical interface 600 may include a tab bar 610 that includes a number of graphic tabs 615, 620, 625, and 630. Each tab may represent a section categorization of the information being presented. In this example, assume that the user performed a search of the user's files. Each of tabs 615, 620, 625, and 630 may represent a type of file that matched the search. Tab 615 may represent documents, such as word processing and spreadsheet documents, tab 620 may represent web pages or links, tab 625 may represent multi-media files, and tab 630 may represent uncategorized files.

Graphical interface 600 may also include a graphic flash area 640 and a content list area 650. Flash area 640 may include a portion of graphical interface 600 that is used to display a representation of a particular content item. The representation shown in flash area 640 may be relatively quickly displayed or "flashed" to the user as the user navigates the content. Content list area 650 may display a more detailed list representing a number of content items. In the example shown in FIG. 6, a textual representation is used to present a list of document names and corresponding document types to the user.

As previously mentioned, the content, or at least part of the content, being browsed through graphical interface 600 may be stored remotely at a device connected via network 110. Device 200 may cache and intelligently download content over network 110 to provide a relatively smooth interface even over potentially slow network links. This aspect of device 200 will be described in more detail below with reference to FIG. 11.

In some implementations, tabs may be dynamically created and added to graphical interface 600 as new content is received over network 110. For instance, device 100 may initially display tabs 615, 620, 625, and 630, and then as new content associated with a different section or category is received over network 110, the new tab may be added to the list of tabs shown in FIG. 6. Similarly, the content may be dynamically modified as the user edits the content. For example, the content may correspond to contacts in a contact storage application. Assume that the user adds a new contact entry for someone whose last name begins with "Sh". If the tabs are labeled to indicate sections of the alphabet, such as "Sa—St", device 100 may dynamically change the tab labels to rearrange the labels (e.g., a tab may now be labeled "Sa—Sh") based on the modified content.

Referring back to FIG. 5, a user may quickly browse through the content presented by graphical interface 600 by selecting tabs on tab bar 610. More particularly, device 200 may detect selection of one or more of tabs 615, 620, 625, or 630 based on a gesture on the selected tab (block 520). For instance, the user may touch on touch-screen display 230, with a finger or stylus, the tab in which the user is interested. Alternatively, the gesture may be a gesture made through a directional pad, such as D-pad 252. In some implementations, it may be possible to select or partially select multiple simultaneous tabs. For instance, selecting (e.g., touching) an area between two tabs on graphical interface 600 may cause content items corresponding to both tabs to be displayed to the user.

In response to the detection of a tab being selected by the user, device 200 may visually highlight or distinguish the selected tab (block 530). The visual highlighting may provide feedback to the user confirming the selection of the tab. As particularly shown in FIG. 6, tab 625 may correspond to the tab selected by the user and is visually highlighted by enlarging tab 625 relative to tabs 615, 620, and 630. Tab 620 is shown as being partially enlarged, potentially indicating that some of the content corresponding to this tab will be shown.

Referring back to FIG. 5, device 200 may display a list of the content items corresponding to the selected tab (block 540). In the example of FIG. 6, content list area 650 presents a textual list of the content items corresponding to the selected tab (i.e., tab 625). The file names corresponding to the content items and the type of each content item are particularly shown. In alternative implementations, other information corresponding to the content items may instead or additionally be presented to the user. The content items shown in content list area 650 may correspond to all of the content items that correspond to multi-media tab 625 or a subset of the items. These content items may be considered to be the "active" group or page of content items corresponding to the user's interaction with device 200 (e.g., the user's selection of a tab). For example, if the number of content items corresponding to tab 625 is too large to all be shown in content list area 650, only a portion of the content items may be shown. In this situation, a slider bar, such as slider bar 655 may be shown to allow the user to scroll through the content items at a finer grain (i.e., each content item may be individually seen) than using tabs 610. In the example of FIG. 6, tab 620 is shown partially highlighted and tab 625 is "fully" highlighted, potentially indicating that content list area 650 may display content items from categories corresponding to both of these tabs or that content items from the more visually prominent tab may be given a higher ranking when displaying the items to the user.

Device 200 may select a content item that is representative of the currently active group of content items (block 550). In one implementation, the currently active group of content items may correspond to the content items for the selected tab. Alternatively, the currently active group of content items may correspond to the content items that are shown in content list area 650.

The selection of a representative content item from the currently active group of content items (block 550) may be performed using a number of possible techniques. For example, a content item may be selected based on the type of items in the currently active group so that the selected content item is of a type equal to the type of content item that is most prevalent in the currently active group. In this situation, the representative content item may be selected as, for instance, a random one of the most prevalent content item types or the most recently accessed one of the most prevalent content item types. Another possible technique for selecting a representative content item may include selecting content items based on a user generated list of possible content items, based on an analysis of the content of the content items, or based on external factors relating to the content items (e.g., the historical popularity of a content item). In general, the representative content item may be selected as a content item that is amenable to being "flashed" to the user as a visual representation that can be presented in a way that assists the user in understanding the type of content items that are near the current navigation point.

Device 200 may display a representation of the selected content item (block 560). The representation may be displayed in flash area 640. The representation may be designed to quickly convey to the user the content item or type of the content item. For example, assume in FIG. 6 that the representative content item is a photograph of a mountain. As illustrated in FIG. 6, a thumbnail representation 645 of this image may be displayed. For a text document, a snippet of the text document or a graphic icon that generally represents a text document may be displayed. Other representations may be displayed for other types of content items. For example, for a music file, a thumbnail image of the corresponding album cover or an icon generally representing a music file may be displayed.

The user may perform other actions relevant to the content items. For example, the user may in some way select a content item, such as by touching or touching and holding (e.g., sustaining contact with) the desired line in content list area 650. In this case, device 200 may present the selected content item to the user, such as by launching an application associated with the content item (e.g., starting a picture viewing program for an image) (block 570). Device 200 may present the selected content item using an action that may vary based on the type of selected content. For example, for a word processing document, device 200 may start a document editor. For a music file, device 200 may begin to play the file. For a photograph, device 200 may start photo editing or viewing software.

The user may also move slider bar 655 or select other tabs from tab bar 610 to display additional content sections (block 560). In this case, device 200 may scroll to show next (or previous) results or groups of results that correspond to the selection.

In some implementations, if all the results for a selected tab are exhausted, device 200 may begin to show results for the next tab in response to a scroll operation with slider bar 655. The tab corresponding to the next tab may be accordingly visually highlighted.

Figure 7:
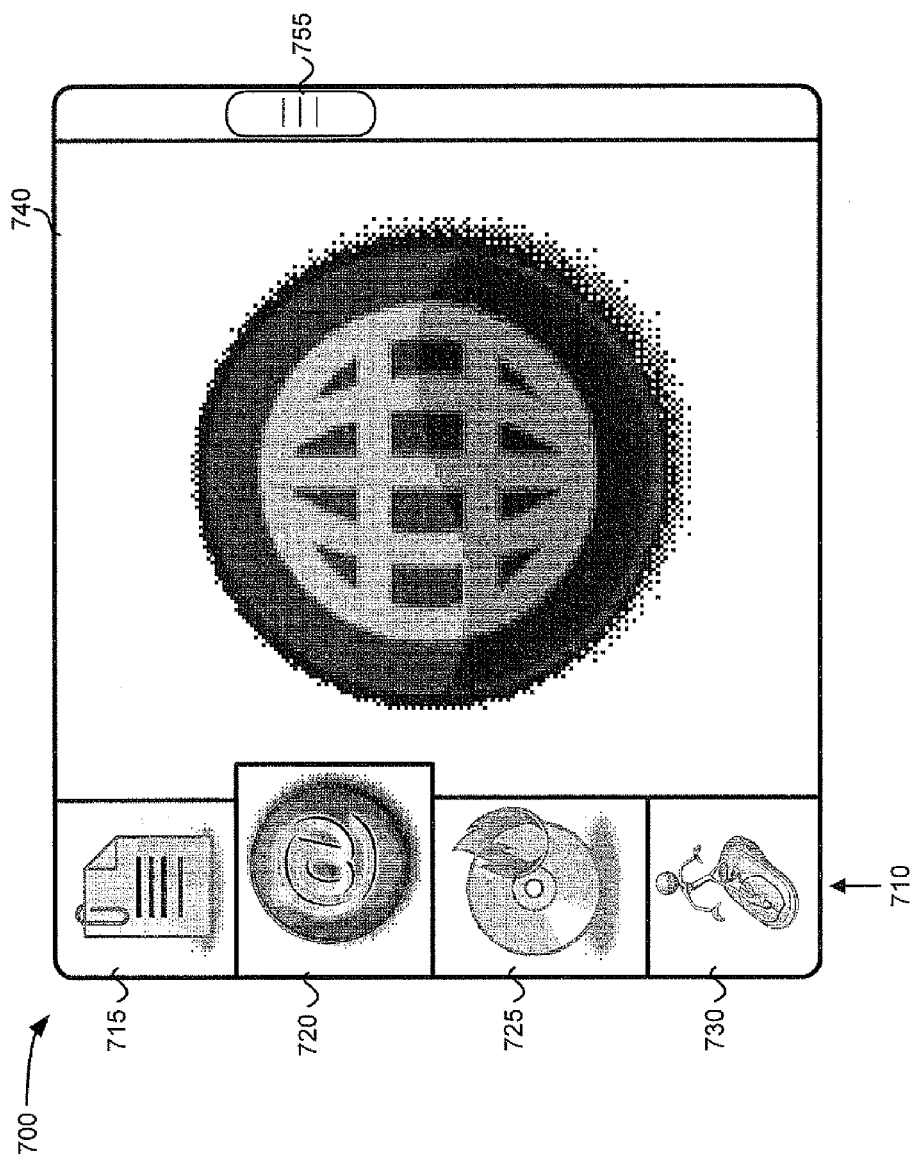
FIG. 7 is a diagram illustrating another implementation of an exemplary graphical interface that may present categorized content.

FIG. 7 is a diagram illustrating another implementation of an exemplary graphical interface that may present categorized content, such as the graphical interface referred to in block 510 (FIG. 5). As with graphical interface 600, graphical interface 700 may be displayed, for instance, in response to the user requesting to view information (content).

As particularly shown in FIG. 7, graphical interface 700 may include a navigation bar 710 that includes a number of tabs 715, 720, 725, and 730. Navigation bar 710 and tabs 715, 720, 725, and 730 may be implemented similarly to navigation bar 610 and tabs 615, 620, 625, and 630, respectively. Graphic interface 700 may include a flash area 740 and a slider bar 755.

As with flash area 640, flash area 740 may include a portion of graphical interface 700 that is used to display a representation of a particular content item in the current page or group of content items. In contrast to graphical interface 600, which includes flash area 640 and content list 650, graphical interface 700 may not include a content list section. This may allow for flash area 740 to be presented in a larger portion of the graphical interface.

Tabs 715, 720, 725, and 730 may operate similarly to the tabs of FIG. 6. That is, users may use tabs 715, 720, 725, and 730 to easily scroll through categorized content items. Based on the selected tab 715, 720, 725, or 730, device 200 may select a content item (block 550, FIG. 5) and may display a representation of the content item in flash area 740. As with flash area 640, the representation may be designed to quickly convey to the user the content item or type of the content item. Because the content items may be arranged by category, flash area 640 may present a graphic to the user that allows the user to quickly ascertain the currently navigated location in the content items. For example, as illustrated in FIG. 7, an icon representing a web page may be shown to indicate that the content item being flashed to the user is a web page or a link to a web page.

Slider bar 755 may provide the user with a content navigation control mechanism in addition to using tab navigation bar 710. In one implementation, slider bar 755 may provide a finer grain control mechanism than tabs 715, 720, 725, and 730 for scrolling through content items. For example, while tabs 715, 720, 725, and 730 may control large jumps into different categories of content, slider bar 755 may be used to scroll between successive content items in a category.

In one implementation, selection (e.g., touching on touch-screen display 230) of the icon shown in flash area 740 may perform an action such as replacing flash area 740 with a content list view similar to content list 650. In this manner, a user may use the flash representations to quickly estimate or determine a location with the user's content and then may switch to the content list view to select a particular content item.

Figure 8:
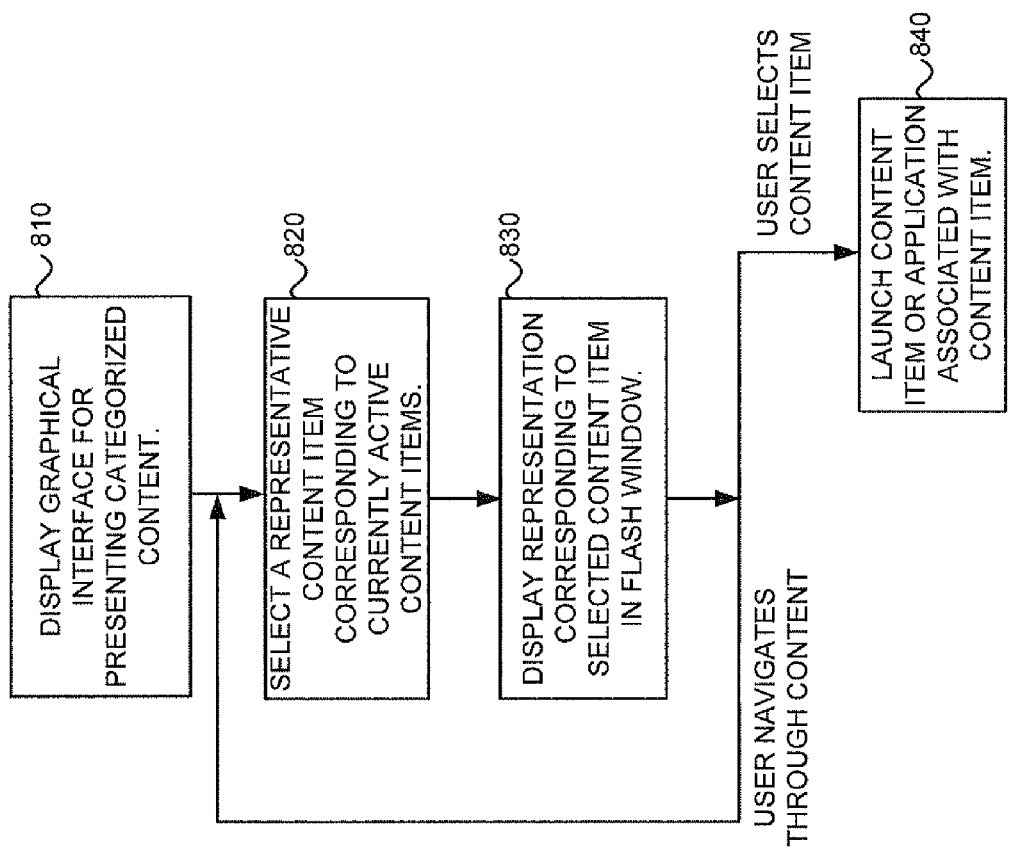
FIG. 8 is a flow chart illustrating exemplary operations to present content to a user through a graphical interface.

FIG. 8 is a flow chart illustrating exemplary operations, according to an alternative implementation, to present content to a user through a graphical interface. The operations of FIG. 8 may be performed by device 200.

Device 200 may display a graphical interface for presenting categorized content to a user (block 810). The graphical interface may be displayed, for example, as part of a "content viewer" or search application that the user initiates from device 200.

Figure 9:
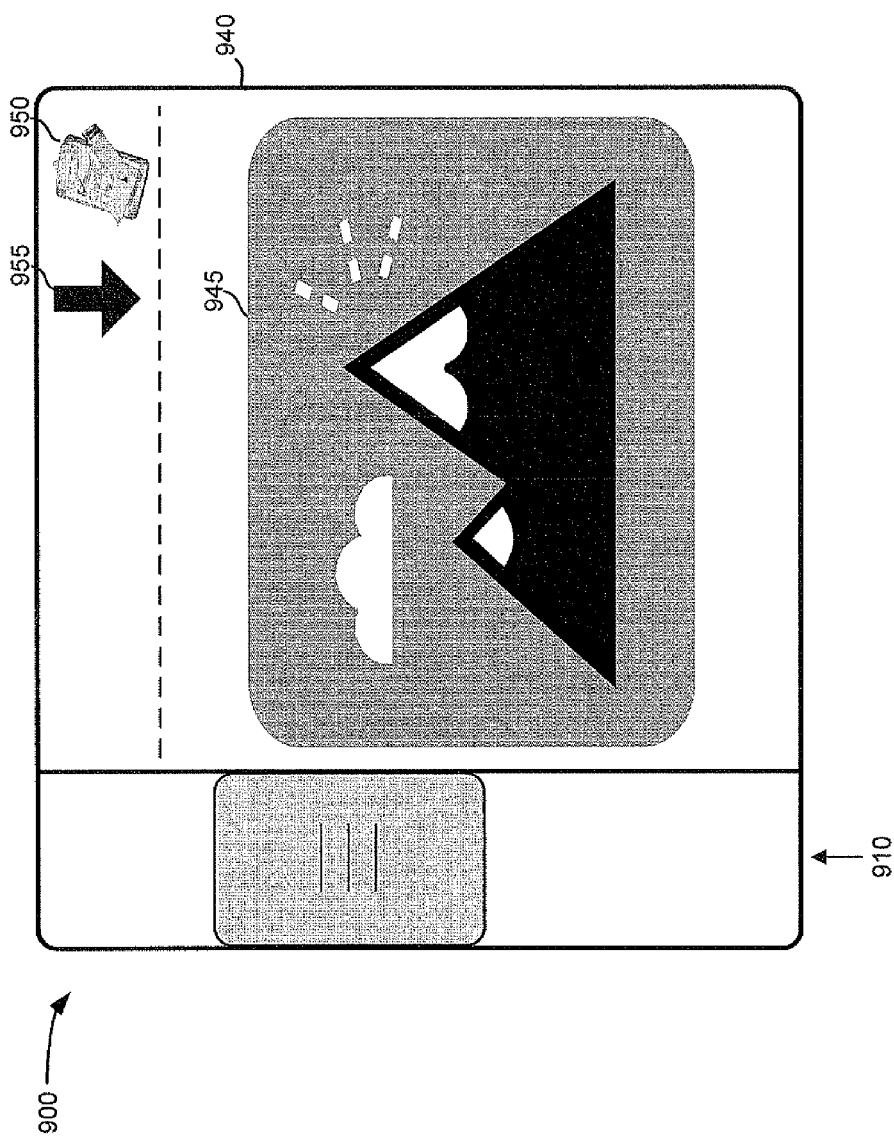
FIG. 9 is a diagram illustrating an exemplary graphical interface that may present categorized content.

FIG. 9 is a diagram illustrating an exemplary graphical interface 900 that may present categorized content, such as the graphical interface referred to in block 810 (FIG. 8). Graphical interface 900, as with graphical interfaces 600 and 700, may be displayed, for instance, in response to the user requesting to view information (content). Device 200 may obtain a list or set of links or other references to content items based on the user request for information. The list or set of links or other references to content items may be considered to be the active group of content items corresponding to the current navigation point selected by the user through graphical interface 900.

As particularly shown in FIG. 9, graphical interface 900 may include a slider bar 910 through which a user may scroll through the content. Graphical interface 900 may also include a flash area 940. Flash area 940 may be used to display a representation of a particular content item corresponding to content items in a current page or group of content items accessed through slider bar 910. The representation shown in flash area 940 may be relatively quickly displayed or "flashed" to the user as the user navigates through the content. Flash area 940 may additionally include one or more control icons that, when selected by the user, may initiate additional actions by device 200 relating to graphical interface 900. For example, a content list icon 950 may, when selected by the user, cause flash area 940 to be changed to a list view that displays a textual representation of the current page or group of content items. Activation icon 955 may, when selected by the user, launch an application associated with the content item corresponding to flash area 940.

Referring back to FIG. 8, device 200 may select a content item that is representative of a currently active group of content items (block 820). In one implementation, the currently active group of content items may correspond to content items scrolled-to by slider bar 910. The selection of a representative content item from the currently active group of content items (block 820) may be performed using a number of possible techniques, such as the techniques discussed previously with respect to block 550 (FIG. 5). For example, a content item may be selected based on the type of content items in the content items near the currently navigated position so that the selected content item is of a type equal to the type of content item that is most prevalent in the content item near the currently navigated position.

Device 200 may display a representation of the selected content item (block 830). The representation may be displayed in flash area 940. The representation may be designed to quickly convey to the user the content item or type of the content item. For example, as illustrated in FIG. 9, assume that the representative content item is a photo. A corresponding image 945 may be shown in flash area 940. Other representations may be displayed for other types of content items.

The user may continue to navigate through the content using slider bar 910. As the user scrolls through the content items, device 200 may continue to select representative content items and "flash" the graphic representation of the content items in flash area 940.

At some point the user may select a content item. For example, the user may touch flash area 940 on touch-screen display 230 to select the content item that is currently represented in flash area 940. Alternatively, an icon, such as activation icon 955, may be provided that, when selected, causes the content item that is currently represented in flash area 940 to be selected. Selecting the content item may cause device 200 to launch the content item (e.g., when the content item represents an application) or launch an application associated with the content item (block 840).

Figure 10:
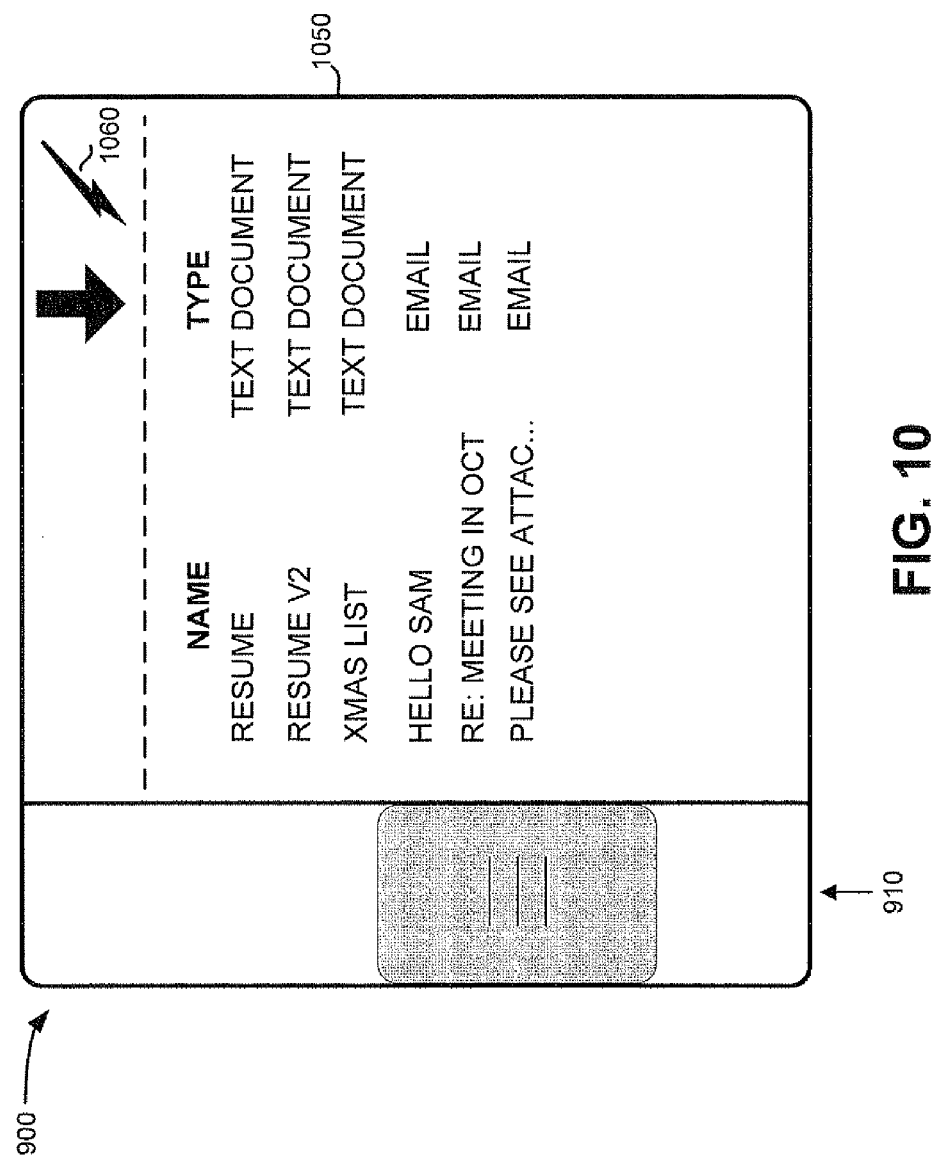
FIG. 10 is a diagram illustrating an exemplary display presented by the graphical interface shown in FIG. 9 after selection of a content list icon.

FIG. 10 is a diagram illustrating an exemplary display presented by graphical interface 900 after selection of content list icon 950. Selection of content list icon 950 may cause flash area 940 to change to content list area 1050. Content list area 1050 may display a more detailed list representing a number of content items. In the example shown in FIG. 10, a textual representation is used to present a list of document names and corresponding document types to the user. A flash icon 1060 may also be displayed. Flash icon 1060, when selected by the user, may cause graphical interface 910 to transition back to the flash view shown in FIG. 9.

Although the above discussion of flash area 940 discussed updating flash area 940 in response to user navigation, in alternative implementations, flash area 940 could be updated periodically device 200. For example, based on a user configurable setting, flash area 940 may periodically select and display a different representative content item corresponding to the currently active content items.

FIG. 11 is a flow chart illustrating downloading content on an as-needed basis over network 110. The operations of FIG. 11 may be performed, for example, by device 200. In response to a user request for information, such as, for example, a search of the user's files, a search of public files on a wide area network (e.g., the Internet), or a request to view a certain type of file (e.g., all music files), device 200 may determine an initial set of results or result snippets to retrieve (block 1110). The initial set may be a subset of the entire set of results. The initial set of results may be initially stored at one or both of device 200 or a remote device, such as at personal content database 125. In situations where at least some of the initial set of results are stored remotely, device 200 may request the needed information over network 110.

As mentioned, the determined initial set of results may be a subset of the entire set of requested results. What constitutes the subset may be preconfigured for device 200 or configured based on user options. For example, device 200 may request the top ten results in any category tab as part of the initial set of results. Alternatively, device 200 may wait until a user selects a particular category tab or navigates to a position in the results using a slider bar before requesting any results. Further, the results requested may be a summary description (snippet) of information corresponding to the content. For example, for a document such as an email or music file, only the title may be requested. For a photo, only a small thumbnail of the photo may be initially requested.

In some implementations, the initial set of results may differ based on the location of the results. For examples, for large files located across a relatively slow network, such as a cellular network, only a limited number of results for each category may be requested. For a faster connection, such as if the files are stored locally on device 200 or over a fast connection (e.g., local area network connection or wired connection), a larger number or all of the results for each category may be requested.

Device 200 may retrieve the current set (e.g., the initial set or selected set) of results (block 1120). Device may display the results corresponding to the selected content items (block 1130). For example, as shown in FIG. 6, graphical interface 600 may display results in flash area 640 and content list area 650. In response to a user request for additional information, (block 1140), such as a category change or a request to "scroll down" to view more results, device 200 may determine the next set of results to retrieve (block 1150). The next set of results may be determined similarly to the initial set of results and based on the user request. For example, if the user changes category tabs, device 200 may determine the next set of results as results from the new category tab. If the user requests more results from the current category, device 200 may retrieve additional results from the category. In either case, device 200 may select a representative content item from the results and display the representative content item in a flash window, such as flash area 640.

Device 200 may next retrieve and present, as appropriate, the next set of results (block 1050). Results not present on device 200 may be retrieved remotely.

In some implementations, device 200 may attempt to predict what content the user will next request. Device 200 may then request this content before it is actually requested by the user. For instance, if a user is viewing the first ten results for a tab, device 200 may begin to load the next ten results for the tab even before the user has scrolled to request the results. Pre-fetching content is known in the art and will not be described in detail herein.

Device 200, as described above with reference to FIG. 11, can effectively cache documents that are requested as part of the results of a search or other request for categorized documents. A graphical interface, such as graphical interface 600, including tabs 655-680, may be used to easily navigate to selected content, and together with the dynamic downloading of files over a network such as network 110, can provide a responsive and easily navigatable user interface for exploring or viewing content, even when data is stored remotely over a relatively slow network (e.g., certain cellular networks).

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks and/or acts have been described with regard to the process illustrated in FIGS. 5, 8, and 11, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A method comprising:
retrieving, by a computing device, an identification of a set of content items based on a request for information from a user of the computing device;
providing, on a display associated with the computing device and in a first portion of a graphical interface, information identifying a subset of the set of content items and a slider bar that controls the subset of the content items being identified in the first portion of the graphical interface;
determining, by the computing device, a group of active content items, from the set of content items, based on a position of a navigation point, on the slider bar, in the graphical interface,
the group of active content items corresponding to the subset of the set of content items being identified in the first portion of the graphical interface;
selecting, by the computing device, a particular content item, from the group of active content items, that is representative of the group of active content items and is included in a user generated list of possible representative content items; and providing, on the display associated with the computing device and in a second portion of the graphical interface, a representation of the particular content item.

2. The method of claim 1, where the particular content item is selected based on types of content items in the group of active content items.

3. The method of claim 1, where selecting the particular content item includes:
   determining that a particular type, of the particular content item, is most prevalent in the group of active content items; and
   randomly selecting the particular content item from two or more other content items, of the group of active content items, that are included in the user generated list of possible representative content items and are of the particular type that is most prevalent in the group of active content items.

4. The method of claim 1, where determining the group of active content items includes:
   displaying a plurality of selectable graphic tabs in the graphical interface,
      each of the plurality of selectable graphic tabs corresponding to a subset of the set of content items;
   detecting a selection of a particular tab of the plurality of selectable graphic tabs; and
   determining the group of active content items based on the selection of the particular tab and the position of the navigation point on the slider bar.

5. The method of claim 4, further comprising:
   visually distinguishing the particular tab from one or more other of the graphic tabs after detecting the selection of the particular tab.

6. The method of claim 1, further comprising:
   launching an application associated with the particular content item based on a selection, by the user, of the representation of the particular content item.

7. The method of claim 1, further comprising:
   retrieving content items from a remote server based on a selection of the particular content item.

8. The method of claim 7, where the remote server is accessed via a wide area network.

9. The method of claim 1, where the group of active content items is determined based on a user interaction, of the user, with the computing device through the graphical interface.

10. A device comprising:
   a memory to store a plurality of instructions; and
   a processor to execute one or more of the plurality of instructions to:
      provide, on a display associated with the device and in a first area of a graphical interface, information identifying a group of active content items from a set of content items and a slider bar that controls the group of active items being identified in the first area of the graphical interface;
      determine the group of active content items based on a position of a navigation point on the slider bar,
      select a first representative content item that is representative of the group of active content items and is included in a user generated list of possible representative content items;
      provide, on the display associated with the device and in a second area of the graphical interface, a representation of the representative content item;
      detect user input indicating a change of the position of the navigation point on the slider bar;
      select, based on the change of the position of the current navigation point, a second representative content item that is included in the user generated list of possible representative content items; and
      update the second area to display a second representation of the second representative content item.

11. The device of claim 10, where, when selecting the first representative content item, the processor is to execute at least one of the plurality of instructions to:
   select the first representative content item based on types of content items in the group of active content items.

12. The device of claim 11, where, when selecting the first representative content item, the processor is to execute at least one of the plurality of instructions to:
   determine that a particular type, of the types, is most prevalent in the group of active content items; and
   select the first representative content item that is included in the user generated list of possible representative content items and matches the particular type that is most prevalent in the group of active content items.

13. The device of claim 10, where the processor is further to execute at least one of the plurality of instructions to:
   display a plurality of selectable graphic tabs in the graphical interface,
      each of the plurality of selectable graphic tabs corresponding to a subset of the set of content items;
   detect a selection of a particular tab of the plurality of selectable graphic tabs; and
   determine the group of active content items based on the selection of the particular tab.

14. The device of claim 13, where the processor is further to execute at least one of the plurality of instructions to:
   retrieve the group of active content items from a remote server based on the selection of the particular tab.

15. The device of claim 14, where the remote server is accessed via a wide area network.

16. The device of claim 10, where the set of content items includes at least one of multi-media files, documents, or photos.

17. A non-transitory computer-readable medium storing instructions, the instructions comprising:
   one or more instructions that, when executed by at least one processor of a device, cause the at least one processor to:
      provide, for display and in a first portion of a graphical user interface, information identifying a group of active content items, of a set of content items, corresponding to a first position of a navigation point on a slider bar of a graphical interface;
      select a first representative content item that is representative of the group of active content items and is included in a user generated list of possible representative content items;
      provide, for display, a first representation of the first representative content item in a second portion of the graphical interface;
      select, based on a second position of the navigation point on the slider bar of the graphical interface, a second representative content item; and
      provide, for display, a second representation of the second representative content item in the second portion of the graphical interface.

18. The non-transitory computer-readable medium of claim 17, where the one or more instructions to select the second representative content item comprise:

one or more instructions that, when executed by the at least one processor, cause the at least one processor to:
  determine a different group of active content items, of the set of content items, that correspond to the second position of the navigation point, and
  select the second representative content item that is representative of the different group of active content items.

19. The non-transitory computer-readable medium of claim 17, where the instructions further comprise:
  one or more instructions that, when executed by the at least one processor, cause the at least one processor to:
    detect user input, through the graphical interface, indicating a change of position of the navigation point; and
    determine the second position of the navigation point based on the change of position.

20. The non-transitory computer-readable medium of claim 17,
  where the second portion of the graphical interface is a flash area,
  where the one or more instructions to provide, for display, the first representation of the first representative content comprise:
    one or more instructions that, when executed by the at least one processor, cause the at least one processor to:
      flash the first representation of the first representative content in the flash area, and
  where the one or more instructions to provide, for display, the second representation of the second representative content comprise:
    one or more instructions that, when executed by the at least one processor, cause the at least one processor to:
      flash the second representation of the second representative content in the flash area.

21. The non-transitory computer-readable medium of claim 17,
  where the first representative content includes a text document, and
  where the first representation of the first representative content includes a snippet of the text document.

* * * * *